United States Patent [19]

Estes, Jr.

[11] Patent Number: 4,849,651
[45] Date of Patent: Jul. 18, 1989

[54] TWO-STATE, BILATERAL, SINGLE-POLE, DOUBLE-THROW, HALF-BRIDGE POWER-SWITCHING APPARATUS AND POWER SUPPLY MEANS FOR SUCH ELECTRONIC POWER SWITCHING APPARATUS

[75] Inventor: Earl M. Estes, Jr., Tucson, Ariz.

[73] Assignee: Hughes Aircraft Company, Los Angeles, Calif.

[21] Appl. No.: 160,219

[22] Filed: Feb. 24, 1988

[51] Int. Cl.⁴ .......................................... H02M 3/335
[52] U.S. Cl. ...................................... 307/125; 307/66; 307/64; 363/16; 363/134; 363/132
[58] Field of Search ............... 307/125, 448, 451, 468, 307/469, 481, 495, 496, 497, 64, 66; 363/16, 132, 133, 134; 318/310, 315, 317, 314, 318, 322, 323, 325, 326, 327, 328, 329, 332, 339, 341, 345 R, 345 H, 434, 432, 433, 438

[56] References Cited

U.S. PATENT DOCUMENTS

| | | | |
|---|---|---|---|
| 3,769,571 | 10/1973 | Wilkison | 363/134 |
| 4,651,079 | 3/1987 | Wills | 318/811 |
| 4,706,180 | 11/1987 | Wills | 363/132 |
| 4,719,556 | 1/1988 | Wise | 363/132 X |
| 4,768,141 | 8/1988 | Hubertus et al. | 363/16 |

Primary Examiner—William M. Shoop, Jr.
Assistant Examiner—Paul Ip
Attorney, Agent, or Firm—Michael W. Sales; A. W. Karambelas

[57] ABSTRACT

Two-state, bilateral, single-pole, double-throw, half-bridge power-switching apparatus capable of high speed, high current switching over a duty factor range of zero percent to 100% includes a single-wire connector to a source of switching signals, a first FET whose gate is connected to the single-wire connector, and a second FET having its gate connected to the drain of the first FET and its source connected to the drain of the first FET through a device for preventing, in part, cross-current from the first FET to the second FET and for permitting the gate voltage on the second FET to be raised sufficiently high to turn on the second FET. The apparatus also includes a system for delivering on/off signals to the second FET and for holding the second FET on or off in response to switching signals having a duty factor in the range of zero percent to 100%.

9 Claims, 14 Drawing Sheets

4,849,651

TWO-STATE, BILATERAL, SINGLE-POLE, DOUBLE-THROW, HALF-BRIDGE POWER-SWITCHING APPARATUS AND POWER SUPPLY MEANS FOR SUCH ELECTRONIC POWER SWITCHING APPARATUS

BACKGROUND OF THE INVENTION

1. Field of the Invention

This invention relates to two-state, bilateral, single-pole, double-throw, half-bridge power-switching apparatus capable of high-speed, high-current switching over a duty factor range of 0% to 100%. The invention also relates to power supply means for such switches that generates DC voltages at or near AC ground potential that can be delivered to a receiver having a large common mode AC potential imposed upon it.

2. Description of Related Art

Known power-switching devices, such as the current-coupled power switches, light-coupled power switches, transformer-coupled power switches and capacitive-coupled power switches have several drawbacks, such as low switching speeds, effective performance over a duty cycle range smaller than 0% to 100%, a dead-time requirement, and substantial response time delays to changing switching signals.

SUMMARY OF THE INVENTION

This invention provides switching apparatus adapted to provide high efficiency switch mode drive for loads such as half-bridge drive for torque motors; full-bridge drive for reversible DC motors used in servo systems; triple half-bridge drive for three-phase motors; two-phase, full-bridge drive for stepper motors; half-bridge drive for direct-coupled buck converters capable of maintaining continuous inductor conduction with no load; full-bridge drive for transformer-coupled buck converters; full-bridge drive for the output transformer in high-voltage power supplies; half-bridge drive for variable frequency resonant power converters; full-bridge drive for uninterruptible power supplies; half-bridge drive for high-power pulse generators for ZAP/GLITCH testing of power converters and other electronic modules; and half-bridge drive for high-efficiency audio amplifiers for modulating AM transmitters.

These switching apparatus include: a first N-channel FET; single-wire connector means for interfacing said switching apparatus to source means for switching signals, said single-wire connector means being connected to the gate of said first FET; a second N-channel FET, said second FET having its gate connected to the drain of said first FET, and its source connected to the drain of said first FET through means for permitting the gate voltage of said second FET and the drain voltage of said first FET to rise sufficiently high to turn on said second FET; and means for delivering on and off signals to said second FET, and for holding said second FET on or off, in response to switching signals having a duty factor in the range of 0% to 100%.

The invention also relates to a power-supplying means with substantially no common mode AC potential imposed upon it comprising DC-powered receiver means having common mode AC potential substantially above ground imposed thereon; DC source means; and means connecting said receiver means to DC source means through means adapted to deliver DC power continuously to said receiver means.

DESCRIPTION OF THE PREFERRED EMBODIMENTS

Figure 1:
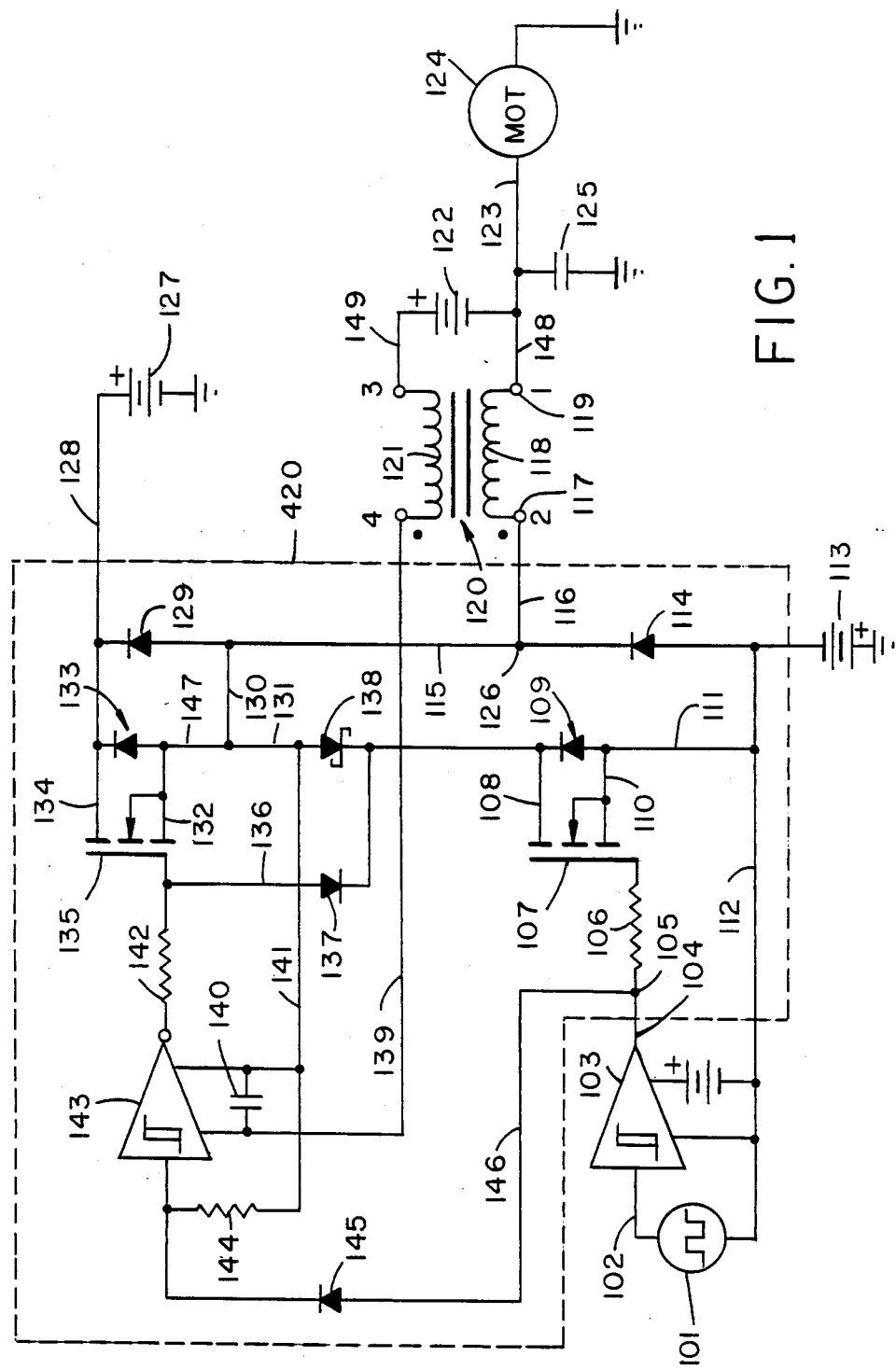
FIG. 1 illustrates a first embodiment of the switching apparatus of this invention.

FIG. 1 shows a first embodiment of the switching apparatus of this invention. Single-wire connector 104 is joined to the output of FET driver 103, which receives input signals from pulse-width modulator 101 on path 102. Single-wire connector 104 is linked through resistor 106 to gate 107 of FET 109. FET 109 also includes drain 108 and source 110. Source 110 is connected via path 111 to negative rail 112 and the negative terminal of battery 113. Single-wire connection node 105 is also joined, via path 146, to inverting FET driver 143 through diode 145. The output of inverting driver 143 is joined through resistor 142 to gate 135 of FET 133. FET 133 includes source 132 and drain 134. Source 132 is connected through path 147 and diode 138 to drain 108 of FET 109. Gate 135 is connected through path 136 and diode 137 to drain 108 of FET 109. Drain 134 of FET 133 is joined via positive rail 128 to the positive terminal of battery 127. Battery 113 is connected to battery 127 through diode 114, path 115, diode 129 and path 128. Path 115 includes output node 126. Output path 116 is joined in series to winding 118 of coupled inductor 120. Winding 118 is joined in series via path 148 to capacitor 125. Capacitor 125 is joined to motor 124 through path 123. Housekeeping battery 22 delivers power on path 149 through winding 121 and path 139 to capacitor 140. The return path for the housekeeping power from capacitor 140 is through paths 141, 131, 130, 115, 116, winding 118 of coupled inductor 120, and path 148.

In operation, a switching cycle with assumed 50% duty factor, wherein FET 133 and FET 109 alternately conduct for equal periods in response to a symmetrical square wave input from source 101, can be considered to begin with the applied square wave in the low state and FET 133 conducting. In this state, current flows from battery 127 through FET 133, winding 118 of coupled inductor 120 and capacitor 125 to battery 127. The current increases at a rate equal to the voltage across coupled inductor 120 divided by the inductance of coupled inductor 120. The low state at node 105 is also present at gate 107, due to propagation via resistor 106. Diode 145 is reverse-biased, thus permitting a low state to be applied to the input of inverting FET driver 143 by resistor 144.

Capacitor 140 acts as the source of housekeeping power for bootstrapped inverting FET driver 143 which must function with a large common mode rectangular have present on its terminals. In order to minimize electromagnetic interference and other detrimental effects of parasitic circuit capacitance, a floating source of housekeeping power, battery 122, is generated with respect to output path 148 where negligible rectangular wave AC potential exists and is delivered to capacitor 140 via coupled inductor 120. This current path is from battery 122, through winding 121 of coupled inductor 120, path 139, capacitor 140, paths 141, 131, 130, 115, 116, winding 118 of coupled inductor 120 and path 148 to battery 122. Windings 121 and 118 of coupled inductor 120 have an equal number of turns so that no net magnetic flux is produced by the housekeeping current and no circulating AC results from the large rectangular wave across the coupled inductor. If battery 122 produces 12 volts, the output signal from bootstrapped inverting FET driver 143 produces approximately 12 volts at gate 135 of FET 133 with respect to source 132.

When the input square wave from source 101 on path 102 to FET driver 103 changes state from low to high, the output signal on path 104 rises to approximately +12 volts with respect to negative rail 112. This causes FET 109 to turn on, resulting in the drop of voltage on drain 108 from approximately +41 volts to −30 volts. As the voltage on drain 108 drops, the voltage on gate 135 is pulled low through diode 137 and path 136. No cross-conduction from FET 133 to FET 109 occurs because diode 138 remains reverse biased until FET 133 has been turned off via diode 137.

During this high-to-low transition period, current flows momentarily from capacitor 140 via bootstrapped inverting FET driver 143, resistor 142, diode 137, FET 109, and battery 113 to capacitor 140. Resistor 142 limits transient current and prevents parasitic oscillation in FET 133. However, the common mode voltage on capacitor 140 drops rapidly, typically at a rate greater than five volts per nanosecond, so that, as the voltage falls, the return path for this current is primarily via distributed circuit capacitance.

When the output voltage on path 141 has fallen to approximately 10 volts above negative rail 112, diode 145 becomes forward-biased, and current flows to the input of bootstrapped inverting FET driver 143, raising its input to a high level. This high level at the input to inverter 143 produces a low signal on its output path to prevent sustained parasitic current flow from capacitor 140, through FET driver 143, resistor 142, diode 137, FET 109, diode 114, and paths 115, 130, 131 and 141 to capacitor 140 when FET 109 is conducting.

With FET 109 conducting and FET 133 turned off, current flows from terminal 119 of coupled inductor 120 through capacitor 125, battery 113 and diode 114 to terminal 117 of coupled inductor 120. The magnitude of current flow decreases because coupled inductor 120 is delivering its stored energy to battery 113.

When the energy stored in coupled inductor 120 drops to zero, the current flow in inductor 120 reverses and current flow is from battery 113 through capacitor 125, winding 118 of coupled inductor 120, paths 116, 115, 130, and 131, diode 138, FET 109, and back to battery 113. The magnitude of this current increases linearly from zero at a rate determined by the inductance of coupled inductor 120 and the voltage drop across inductor 120. During this time, energy from battery 113 is being stored in coupled inductor 120.

When the input square wave from source 101 changes from high to low, the output of driver 103 also changes from high to low. This turns FET 109 off and, via diode 145, causes the input to bootstrapped inverting driver 143 to go low and the output to go high. This raises the voltage on gate 135 of FET 133, causing FET 133 to turn on. In turn, the output voltage on source 132 of FET 133 rises to approximately +30 volts. Again, there is no cross-conduction in this transition because diode 138 can only conduct when FET 133 is turned off, whereas, for cross-conduction to occur, current would have to flow through both of these components simultaneously.

With FET 133 conducting and FET 109 turned off, current flows from terminal 117 of coupled inductor 120 through diode 129, battery 127, capacitor 125 and returns to terminal 119. The magnitude of this current decreases linearly until all energy stored in coupled inductor 120 has recycled into battery 127. At that time, the current in winding 118 of coupled inductor 120 reverses, and the energy storage state begins again.

For most applications of the invention, the input from source 101 is a rectangular wave with variable duty factor. This provides control of the relative conduction periods of FET 133 and FET 109. If FET 133 conducts for a larger portion of the cycle than does FET 109, a net positive voltage is applied to motor 124 causing it to produce an output torque. Conversely, if FET 109 conducts for a larger portion of the cycle than does FET 133, a negative output results, causing motor 124 to produce torque in the opposite direction. If the duty factor is relatively large, wherein FET 133 is turned on during significantly more than 50% of the cycle, the four-state cycle previously described is replaced by a two-state cycle wherein current in winding 118 of coupled inductor 120 flows continuously out of terminal 119. When FET 133 is turned on, current flows from battery 127, through path 128, FET 133, paths 147, 130, 115 and 116, coupled inductor 120, motor 124, and returns to battery 127. The magnitude of the current is increasing. When FET 133 is turned off, current flows from terminal 119 of coupled inductor 120, through motor 124, battery 113, diode 114 and path 116 to coupled inductor 120. The magnitude of the current is decreasing, but does not decrease to zero before the next turn-on of FET 133.

Figure 2:
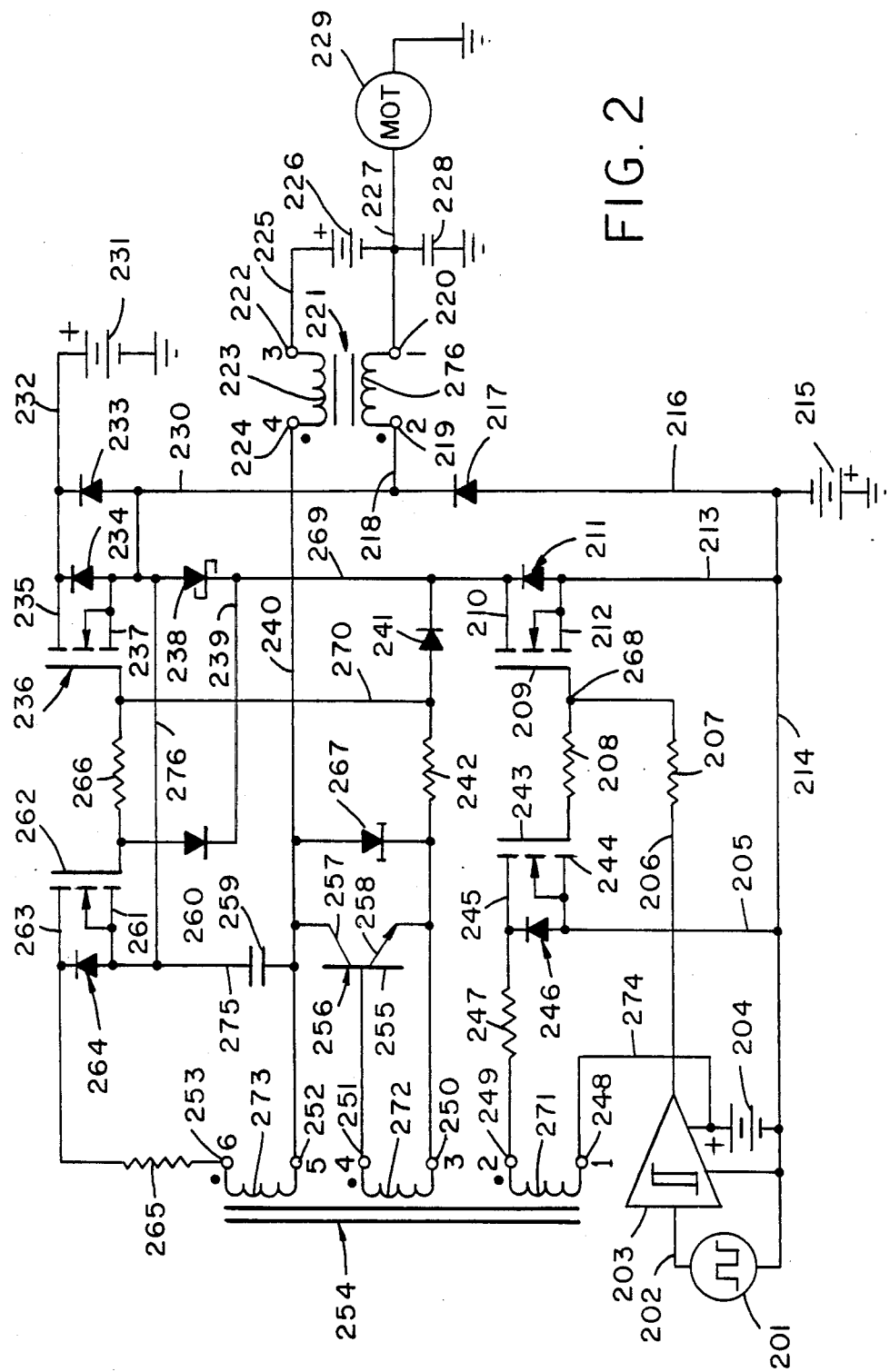
FIG. 2 illustrates a second embodiment of the switching apparatus of this invention.

FIG. 2 illustrates a second embodiment of the switching apparatus of this invention. This embodiment includes switching signal source 201 linked via path 202 to FET driver 203. Output path 206 from FET driver 203 is joined through resistor 207 to single-wire connector node 268. Node 268 is joined to gate 209 of FET 211. The drain 210 of FET 211 is connected through path 269 and diode 238 to source 237 of FET 234. Gate 236 of FET 234 is connected through path 270, diode 241 and path 269 to drain 210 of FET 211. Battery 215 is connected, through its negative terminal, to FET driver 203 via negative rail 214. Battery 215 is connected through path 216, diode 217, diode 233, and positive rail 232 to the positive terminal of battery 231. The positive terminal of battery 231 is also connected through path 232 to drain 235 of FET 234. The negative terminal of battery 215 is connected to the source of FET 211 through paths 214 and 213.

Battery 204 is connected to negative rail 214 and to winding 271 of coupled inductor 254 through path 274. Terminal 249 of winding 271 is connected through resistor 247 to drain 245 of FET 246. Gate 243 of FET 246 is joined through resistor 208 to node 268. Source 244 of FET 246 is connected to negative rail 214 through path 205. Coupled inductor winding 272 is connected through terminal 251 to base 255 of transistor 256. Collector 257 of transistor 256 is joined through path 240 to winding 223 of coupled inductor 221. Winding 223, in turn, is connected to housekeeping power battery 226. Path 240 is also connected to capacitor 259 which, in turn, is connected through path 275 to source 261 of FET 264. Collector 257 of transistor 256 is also connected through path 240 to winding 273 of coupled inductor 254. Terminal 253 of inductor coil 273 is connected through resistor 265 to drain 263 of FET 264.

In operation, a switching cycle with assumed 50% duty factor, wherein FET 234 and FET 211 alternately conduct for equal periods in response to a symmetrical square wave input from source 201, can be considered to begin with node 268 in the low state and FET 234 conducting. In this state, current flows from battery 231 through FET 234, winding 276 of coupled inductor 221, and capacitor 228 back to battery 31. The current flow increases at a rate determined by the inductance of coupled inductor winding 276 and the voltage drop across it, here 30 volts, since battery 231 is 30 volts.

The input square wave voltage from source 201 is low during this time, causing the output of FET driver 203 to be low, thus holding FETs 246 and 211 off because of the low signal on gates 243 and 209. With FETs 246 and 211 turned off, some current flows from capacitor 259 through current regulator diode 267 and resistor 242 to gate 236, holding FET 234 on. FET 264 is also held in the on state through resistor 266, which causes current to flow from capacitor 259 through coupled inductor winding 273, resistor 265 and FET 264 back to capacitor 259 on path 275. This current flow through winding 273 stores energy in coupled inductor 254 for future use.

Capacitor 259 acts as the source of housekeeping power for transistor 256, FET 264 and associated bootstrapped circuits which must function with a large common mode rectangular wave on their terminals. In order to minimize electromagnetic interference and other detrimental effects of parasitic circuit capacitance, a floating source of housekeeping power, battery 226, is generated with respect to output path 227 where negligible rectangular wave potential exists and is delivered to capacitor 259 via coupled inductor 221. This current path is from battery 226, through winding 223 of coupled inductor 221, path 240, capacitor 259, paths 275, 276, 230, 218 and winding 276 of coupled inductor 221 to battery 226. Windings 223 and 276 of coupled inductor 221 have an equal number of turns so that no net magnetic flux is produced by the housekeeping current, and no circulating AC results from the large rectangular wave across the coupled inductor. If battery 226 produces 12 volts, the gate drive voltages applied to FETs 234 and 264 are approximately 12 volts with respect to sources 237 and 261.

When the signal from source 201 changes state from low to high, the output from FET driver 203 rises to approximately +12 volts with respect to rail 214. This causes FETs 246 and 211 to turn on. With FET 211 turned on, the voltage on drain 210 drops from +41 volts to −30 volts. As this drain voltage falls, gates 236 and 262 are pulled low through diodes 241 and 260, respectively. No cross-conduction between FETs 234 and 211 occurs because diode 238 does not become forward-biased until FET 234 has been turned off via diode 241.

During this state, with FET 246 conducting, current from battery 204 flows through winding 271, storing energy in coupled inductor 254 with the return current path including resistor 247 and FET 246. There may also be momentary current flow through transistor 256 depending upon the delay, if any, in turning off FET 264 before FET 246 turns on. If so, current may flow from terminal 251 of winding 272 through the base/emitter junction of transistor 256 to terminal 250. This current flow partially depletes the stored energy in coupled inductor 254, but sufficient stored energy remains to support an immediate high-to-low transition, as where a duty factor of nearly 100% is required. If transistor 256 turns on briefly, an additional small transitional current flows from capacitor 259 through the collector/emitter path in transistor 256, resistor 242, diode 241, FET 211, battery 215 and back to capacitor 259. During this high-to-low transitional state, the common mode voltage on capacitor 259 drops rapidly, typically at a rate greater than five volts per nanosecond, so that the return path for this current is via distributed circuit capacitance.

With FET 211 conducting, currents flows from terminal 220 of coupled inductor 221 through capacitor 228, battery 215, diode 217 and back to terminal 219 of inductor 221. The magnitude of this current decreases because coupled inductor 221 is delivering its stored energy to battery 215. In addition, current flows from battery 204 through winding 271, resistor 247 and FET 246 to battery 204, restoring or maintaining energy in coupled inductor 254 for future use.

When the energy stored in coupled inductor 221 drops to zero, the current flow in winding 276 reverses, and current flows from battery 215 through capacitor 228, terminals 220 and 219 of winding 276, diode 238, FET 211, and back to battery 215. The magnitude of this current increases linearly from zero at a rate determined by the inductance of winding 276 and the voltage drop across winding 276. During this period, energy is being stored in coupled inductor 221.

When the input square wave from source 201 changes state from high to low, the output of FET driver 203 also changes state from high to low turning off FETs 211 and 246. The turn off of FET 246 interrupts the current flow through winding 271 of coupled inductor 254, and current begins to flow through winding 272 and the base/emitter junction of bootstrapped transistor 256 causing transistor 256 to conduct. This establishes a current path from capacitor 259 via transistor 256, resistor 242, gate-to-source of FET 234 and back to capacitor 259. This current flow turns FET 234 on, causing the output voltage at source 237 to rise rapidly at a rate of about two volts per nanosecond to about +30 volts. Current also flows from capacitor 259 through bootstrapped transistor 256, resistor 242, resistor 266, FET 264, and back to capacitor 259. This turns FET 264 on, establishing a current path from capacitor 259 through winding 273, resistor 265, FET 264, and back to capacitor 259. This current flow replenishes the energy in coupled inductor 254 for future use.

The turn-on of FET 264 is delayed from the turn-on of FET 234 by the time constant of resistor 26 and the gate-to-source capacitance of FET 264. This assures that the turn-on of FET 234 is complete before the turn-off of transistor 256 takes place. No cross-conduction between FETs 234 and 211 takes place because the connection from gate 236 to diode 238 via diode 241 causes diode 238 to become reverse-biased before FET 234 turns on.

With FET 234 conducting and FET 211 turned off, current flows from winding 276 through diode 233, battery 231, capacitor 228 and back to winding 276. The amplitude of this current decreases linearly until all the energy stored in coupled inductor 221 has been recycled into battery 231. At that time, the current in winding 276 reverses, and the energy storage state begins anew.

For most applications of the invention, the input from source 201 is a rectangular wave with variable duty factor. This provides control of the relative conduction periods of FET 234 and FET 211. If FET 234 conducts for a larger portion of the cycle than does FET 211, a net positive voltage is applied to motor 229 causing it to produce an output torque. Conversely, if FET 211 conducts for a larger portion of the cycle than does FET 234, a negative output results causing motor 229 to produce torque in the opposite direction.

If the duty factor is relatively large wherein FET 234 is turned on during significantly more than 50% of the cycle, the four-state cycle previously described is replaced by a two-state cycle wherein current in winding 276 of coupled inductor 221 flows continuously out of terminal 220. When FET 234 is turned on, current flows from battery 231, through path 232, FET 234, paths 230 and 218, winding 276 of coupled inductor 221, motor 229, and returns to battery 231. The magnitude of the current is increasing. When FET 234 is turned off, current flows from terminal 220 of coupled inductor 221, through motor 229, battery 215, diode 217 and path 218 to coupled inductor 221. The magnitude of the current is decreasing, but does not decrease to zero before the next turn-on of FET 234.

Figure 3:
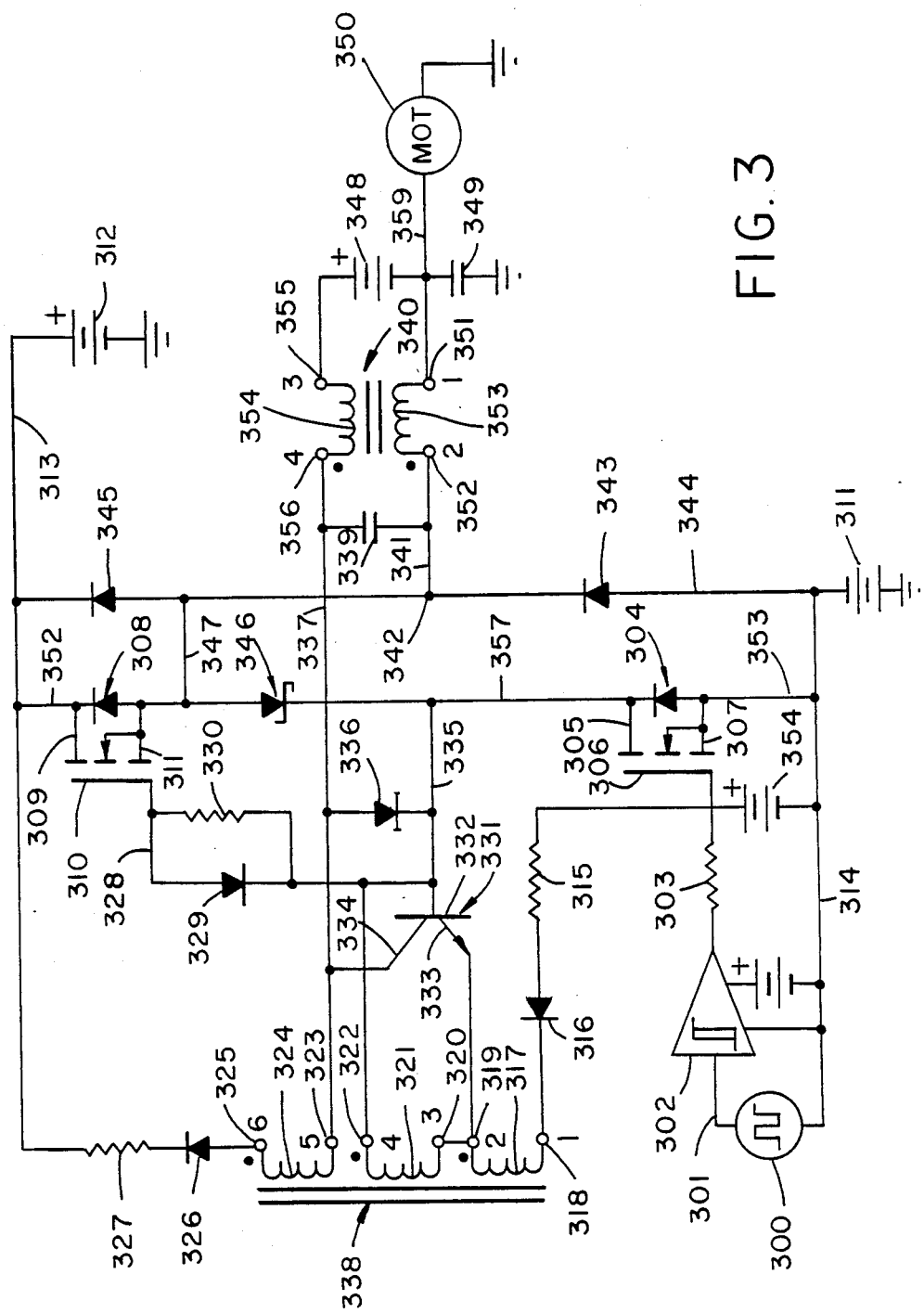
FIG. 3 illustrates a third embodiment of the switching apparatus of this invention.

FIG. 3 shows a third embodiment of a switching apparatus of this invention. In this embodiment, drain 305 of FET 304 is connected through path 357 and diode 346 to source 311 of FET 308. Gate 310 of FET 308 is connected through path 328, diode 329 and paths 335 and 357 to the drain of FET 304. Drain 309 of FET 308 is joined through path 352 and path 313 to the positive terminal of battery 312. Gate 306 of FET 304 is joined to the output of FET driver 302 through resistor 303.

Source 300 delivers switching signals on path 301 to FET driver 302. Source 307 of FET 304 is connected through path 353 and rail 314 to the negative terminal of battery 311. The negative terminal of battery 311 is also connected through path 344, diode 343, diode 345 and rail 313 to the positive terminal of battery 312. The positive terminal of battery 354 is joined through resistor 315 and diode 316 to winding 317 of coupled inductor 338 and through terminals 319 and 320 to winding 321. Windings 317 and 321 are joined through transistor 331 to capacitor 339 and, through diode 329 and path 328, to gate 310 of FET 308. The switching apparatus of FIG. 3 delivers output signals through node 342, path 341, winding 353 and capacitor 349 to motor 350. Housekeeping battery 348 supplies power through windings 354 and 353 of coupled inductor 340 to capacitor 339. Capacitor 339, in turn, supplies power to winding 324 of coupled inductor 338 on path 337.

In operation, a switching cycle with assumed 50% duty factor, wherein FET 308 and FET 304 alternately conduct for equal periods in response to a symmetrical square wave input from source 300, can be considered to begin with the applied square wave in the low state and FET 308 conducting. In this state, current flows from battery 312 through FET 308, winding 353 of coupled inductor 340 and capacitor 349 to battery 312. The current increases at a rate equal to the voltage across coupled inductor 340 divided by the inductance of coupled inductor 340. In this state, current also flows from capacitor 339 through winding 324 of coupled inductor 338, diode 326, resistor 327, rail 313, FET 308, and back to capacitor 339. This current flow keeps coupled inductor 338 charged with stored energy for future use during low-to-high transitions. Since capacitor 339 receives its charge from battery 348 via coupled inductor 340, some of the current comes directly from battery 348 without being stored in capacitor 339. Small currents, as needed, also flow during this period from capacitor 339 through current regulator diode 336 and resistor 330 to maintain the gate-to-source voltage on FET 308, holding FET 308 in the on state.

Capacitor 339 acts as the source of housekeeping power for transistor 331 and its associated bootstrapped circuits which must function with a large common mode rectangular wave on their terminals. In order to minimize electromagnetic interference and other detrimental effects of parasitic circuit capacitance, a floating source of housekeeping power, battery 348, is generated with respect to output path 359 where negligible rectangular wave potential exists and is delivered to capacitor 339 via coupled inductor 340. This current path is from battery 348, through winding 354 of coupled inductor 340, capacitor 339, and winding 353 of coupled inductor 340 to battery 348. Windings 354 and 353 of coupled inductor 340 have an equal number of turns so that no net magnetic flux is produced by the housekeeping current, and no circulating AC results from the large rectangular wave across the coupled inductor. If battery 348 produces 12 volts, the gate drive voltage applied to FET 308 is approximately 12 volts with respect to source 311.

When the switching signal from source 300 changes state from low to high, the output of FET driver 302 also goes from low to high and rises to approximately +12 volts with respect to the −30 volts on rail 314. This causes FET 304 to turn on and the voltage on drain 305 to fall from approximately +41 volts to −30 volts. As the voltage on drain 305 falls, the voltage on gate 310 is pulled low through diode 329. No cross-conduction between FETs 308 and 304 occurs because diode 346 does not become forward biased until FET 308 has been turned off via diode 329.

During this time, current blows as follows: When the voltage at source 311 of FET 308 falls to about 11 volts below positive rail 313, diode 326 becomes back-biased, and the energy stored in coupled inductor 338 causes current to flow from terminal 322 through the base/emitter junction of transistor 331 and back to terminal 320 of winding 321. This current flow through the base/emitter junction of transistor 331 causes transistor 331 to turn on sufficiently to establish a parasitic current path from capacitor 339 collector-to-emitter of transistor 331, winding 321, FET 304, battery 311 and, via distributed circuit capacitance, back to capacitor 339. When the voltage on drain 305 falls to approximately five volts above negative rail 314, current begins to flow from battery 354 through resistor 315 and diode 316 to windings 317 and 321, then through FET 304 back to battery 354. This terminates the parasitic current that flows briefly during the high-to-low transition by causing bootstrapped transistor 331 to turn off.

With FET 304 conducting and FET 308 turned off, current flows from terminal 351 of coupled inductor 340 through capacitor 349, battery 311, diode 343 and back to terminal 352 of inductor 340. The magnitude of this current decreases because inductor 340 is delivering its stored energy to battery 311. During this and the following state, current also flows from battery 354 to resistor 315, diode 316, and Windings 317 and 321, through FET 304 and back to battery 354, which restores to coupled inductor 338 energy required for use during the low-to-high transition.

With FET 304 turned on, once the energy stored in coupled inductor 340 falls to zero, the current flow in the inductor reverses, establishing a new current path from battery 311 to capacitor 349, terminals 351 and 352 of inductor 340, diode 346, FET 304, and back to battery 311. The magnitude of this current increases linearly from zero at a rate determined by the inductance of coupled inductor 340 and the voltage drop across inductor 340. During this time, energy from battery 311 is stored in coupled inductor 340.

When the switching signal from source 300 changes from high to low, FET 304 is turned off. Current then flows from battery 354 through resistor 315, diode 316, windings 317 and 321 of coupled inductor 338, and then through resistor 330 to gate 310, turning FET 308 on. The turn-on of FET 308 causes the voltage at source 311 to rise. This voltage increase propagates via diode 346, paths 357 and 335, and windings 321 and 317 to the cathode of diode 316 causing diode 316 to turn off. Current then flows from terminal 322 of coupled inductor 338 through the base/emitter of transistor 331 and returns to terminal 320. This causes current to flow from capacitor 339 through transistor 331, winding 321, resistor 330, gate-to-source of FET 308, and back to capacitor 339. Although bootstrapped transistor 331 does not amplify the current in inductor 338, it does amplify power and quickly drives gate 310 to 12 volts with respect to source 311.

When the voltage on source 311 rises to approximately 12 volts below the +30 volts on rail 313, diode 326 becomes forward-biased, establishing a current path from capacitor 339 through winding 324, diode 326, resistor 327, rail 313, FET 308, and back to capacitor 339 to restore lost charge to coupled inductor 338 for use at the next low-to-high transition.

Winding 324 can be omitted from this system where the maximum duty factor will not exceed approximately 85%. However, for duty factors approaching 100%, winding 324 is essential.

With FET 308 conducting, current also flows from capacitor 339 through current regulator diode 336, resistor 330, gate-to-source of FET 308, and back to capacitor 339. Diode 336 holds FET 308 in the on state when the duty factor is 100% and at very low switching frequencies. No cross-conduction from FET 308 to FET 304 takes place because the connection from gate 310 to the cathode of diode 346 causes diode 346 to become reverse biased before FET 308 turns on.

With FET 308 conducting and FET 304 turned off, current also flows from terminal 352 through diode 345, battery 312, capacitor 349, and back to terminal 351 of coupled inductor 340. The magnitude of this current decreases linearly until all energy stored in inductor 340 has been recycled into battery 312. Thereafter, the energy storage cycle begins anew.

For most applications of the invention, the input from source 300 is a rectangular wave with variable duty factor. This provides control of the relative conduction periods of FET 308 and FET 304. If FET 308 conducts for a larger portion of the cycle than does FET 304, a net positive voltage is applied to motor 350 causing it to produce an output torque. Conversely, if FET 304 conducts for a larger portion of the cycle than does FET 308, a negative output results, causing motor 350 to produce torque in the opposite direction.

If the duty factor is relatively large, wherein FET 308 is turned on during significantly more than 50% of the cycle, the four-state cycle previously described is replaced by a two-state cycle, wherein current in winding 353 of coupled inductor 340 flows continuously out of terminal 351. When FET 308 is turned on, current flows from battery 312, through rail 313, FET 308, paths 347 and 341, coupled inductor 340, motor 350, and returns to battery 312. The magnitude of the current is increasing. When FET 308 is turned off, current flows from terminal 351 of coupled inductor 340 through motor 350, battery 311, diode 343 and path 341 to coupled inductor 340. The magnitude of the current is decreasing, but does not decrease to zero before the next turn-on of FET 308.

Figure 4:
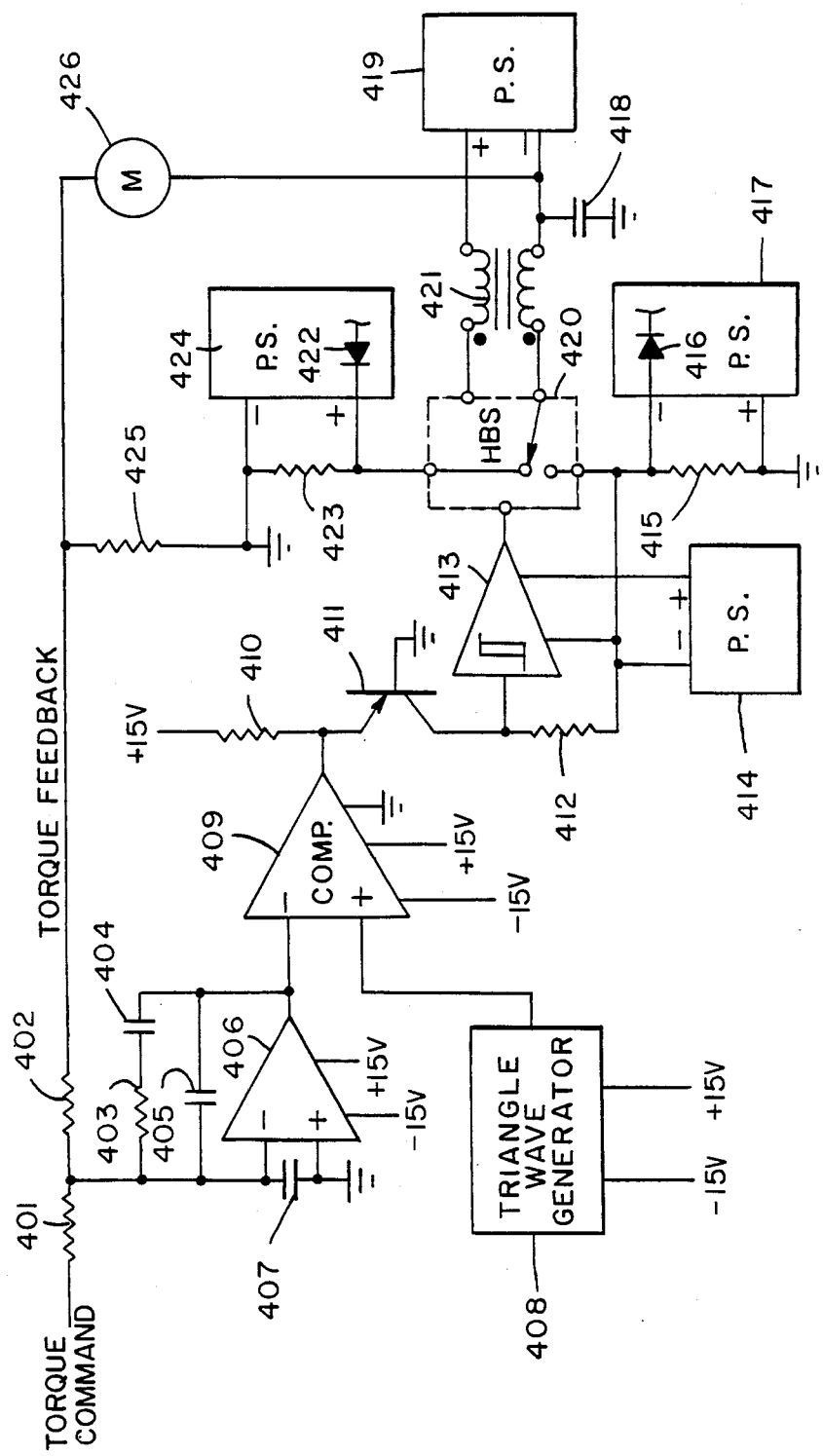
FIG. 4 shows the use of a switch of the kinds shown in FIGS. 1, 2, or 3 as a half-bridge driver for a torque motor used in a servo system.

FIG. 4 shows half-bridge electronic switch 420 and coupled inductor 421 used in a servo amplifier for driving torque motor 426. The torque motor current is sensed at resistor 425 and compared in resistors 401 and 402 with the input torque command. The resulting error voltage is processed by circuit elements 403 through 414 to produce a pulse-width modulated drive signal to half-bridge switch 420. Half-bridge switch 420 can be of any of the configurations shown in FIGS. 1, 2 or 3. Power supplies 417 and 424 are the counterparts of the −30 volts and +30 volts batteries shown in FIGS. 1, 2 and 3. Under some operating conditions, switch mode servo amplifiers, which employ dual power supplies, transfer energy between their positive and negative rails. Since diodes 416 and 422 in power supplies 417 and 424 do not permit reverse current flow, bleeder resistors 415 and 423 are employed to dissipate this recycled energy and thus prevent destructive rail voltages from being produced.

Figure 5:
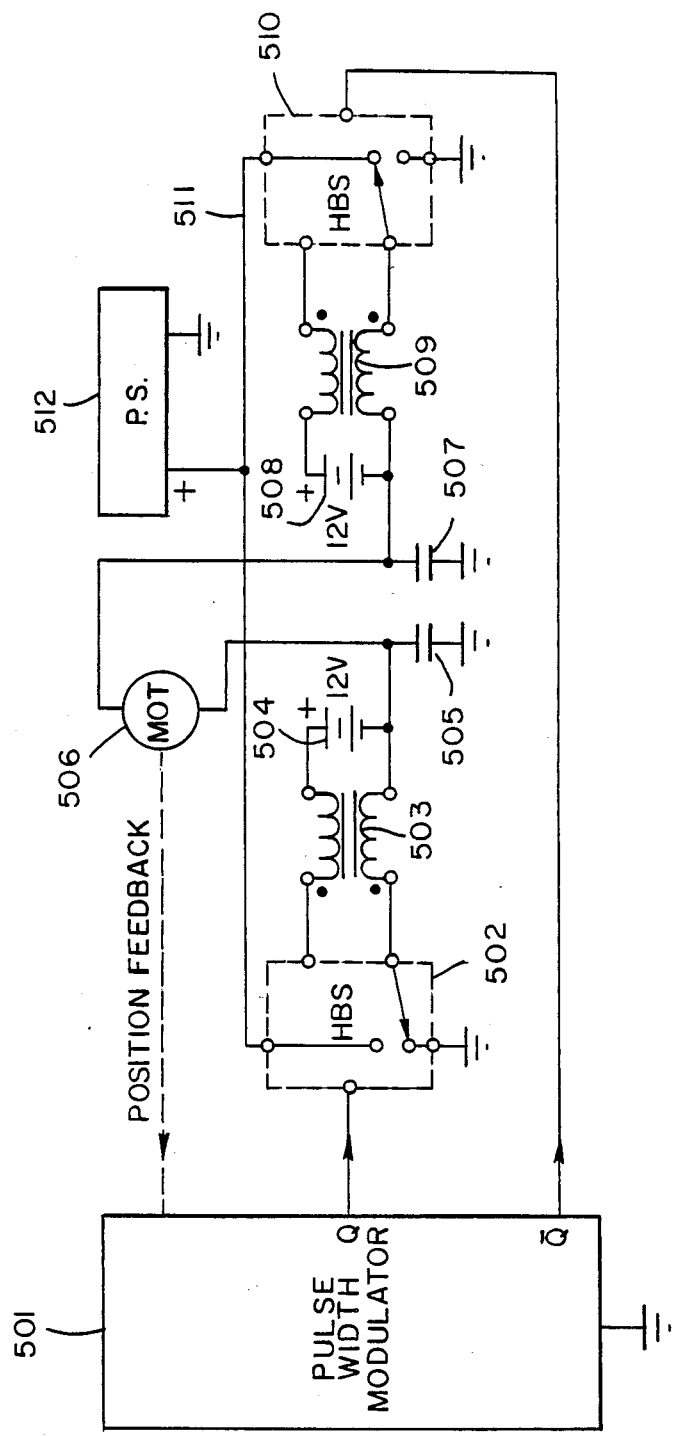
FIG. 5 shows the use of two switches of the kinds shown in FIGS. 1, 2 or 3 together as a full-bridge driver for a reversible DC motor used in a servo system.

FIG. 5 shows two half-bridge electronic switches, of the type illustrated in FIGS. 1, 2 and 3, grouped together to form a full "H" bridge switch mode servo amplifier. In this configuration, both half-bridge switches 502 and 510 receive their drive signals with respect to ground, and both are connected to common positive rail 511. As compared to the half-bridge servo of FIG. 4, no power supply bleeders are required. Since neither motor terminal is at ground potential, monitoring motor current for use as a feedback signal is difficult.

Figure 6:
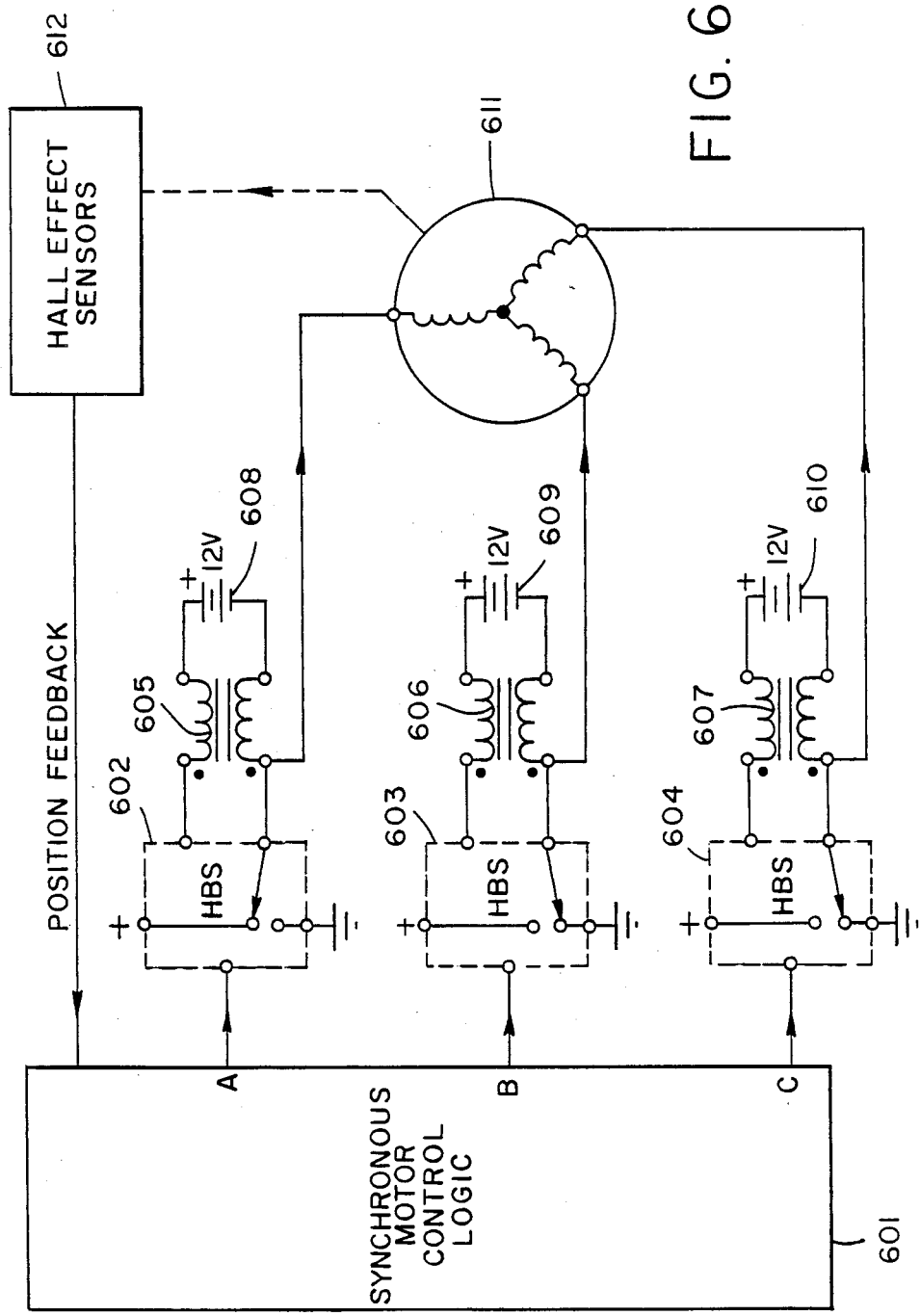
FIG. 6 shows the use of three switches of the kinds shown in FIGS. 1, 2 or 3 as half-bridge drivers for each of the three phases of a three-phase motor.

FIG. 6 shows three half-bridge electronic switches, of the type illustrated in FIGS. 1, 2 and 3, grouped together to form a three-phase motor drive. Call effect sensors 612 provide synchronous motor control logic 601 with a signal indicating motor shaft position. The motor control logic decodes the Hall effect data and provides pulsed drive signals to half-bridge switches 602, 603 and 604. This causes three-phase motor 611 to function as a brushless DC motor. Other variations of the motor control logic can enable the brushless DC motor to function as a reversible motor in a servo system. The single-wire drive to all half-bridge switches is with respect to the common ground.

Figure 7:
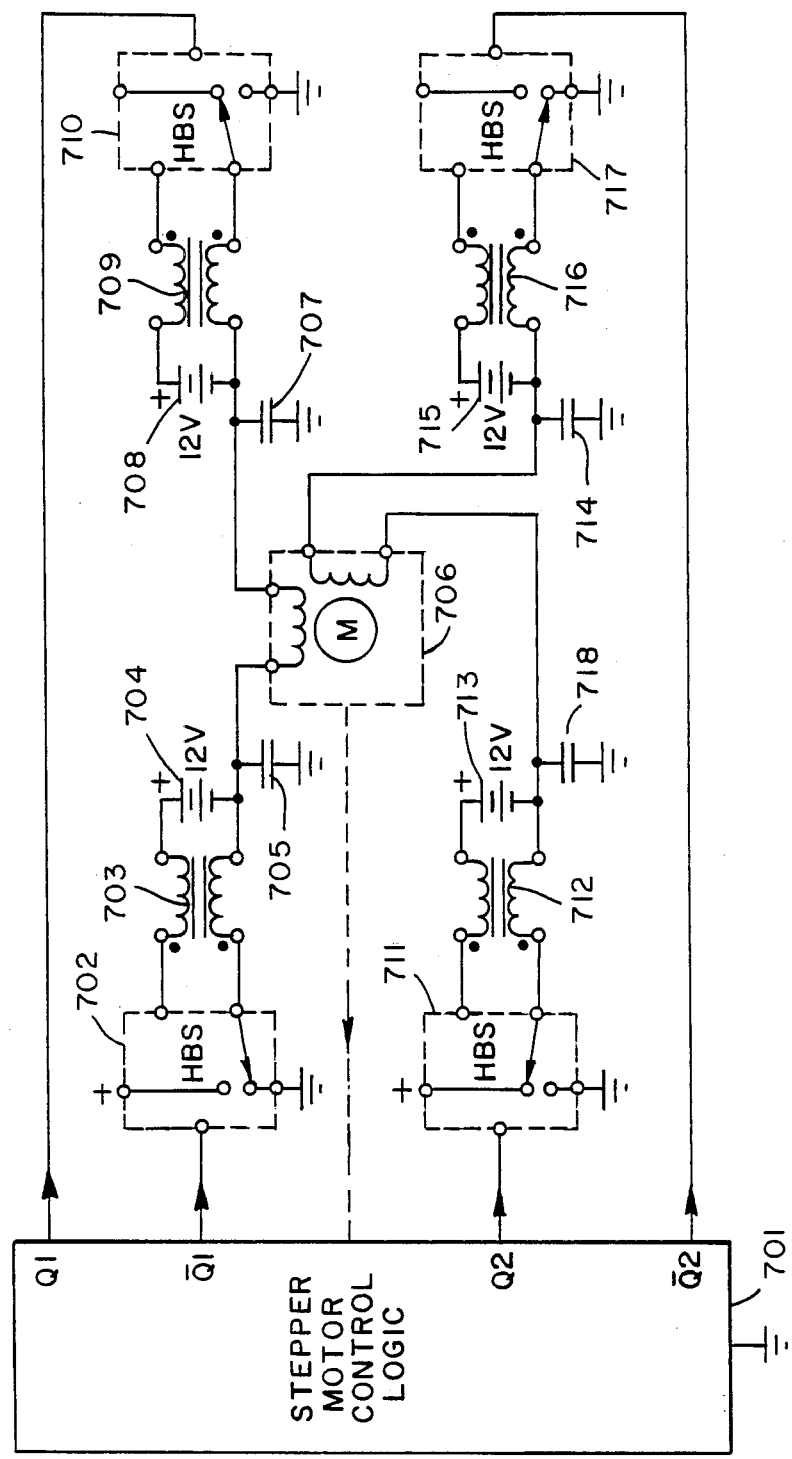
FIG. 7 shows the use of four switches of the kinds shown in FIGS. 1, 2 or 3 as a pair of full-bridge drivers for a stepper motor.

FIG. 7 shows four half-bridge electronic switches, of the type illustrated in FIGS. 1, 2 and 3 grouped together to realize a stepper motor drive consisting of a full "H" bridge drive for each phase. Half-bridge switches 702, 708, 711 and 717 all operate with a common ground and a common positive rail. All four switches are driven by a single-wire interface with respect to the common ground.

Figure 8:
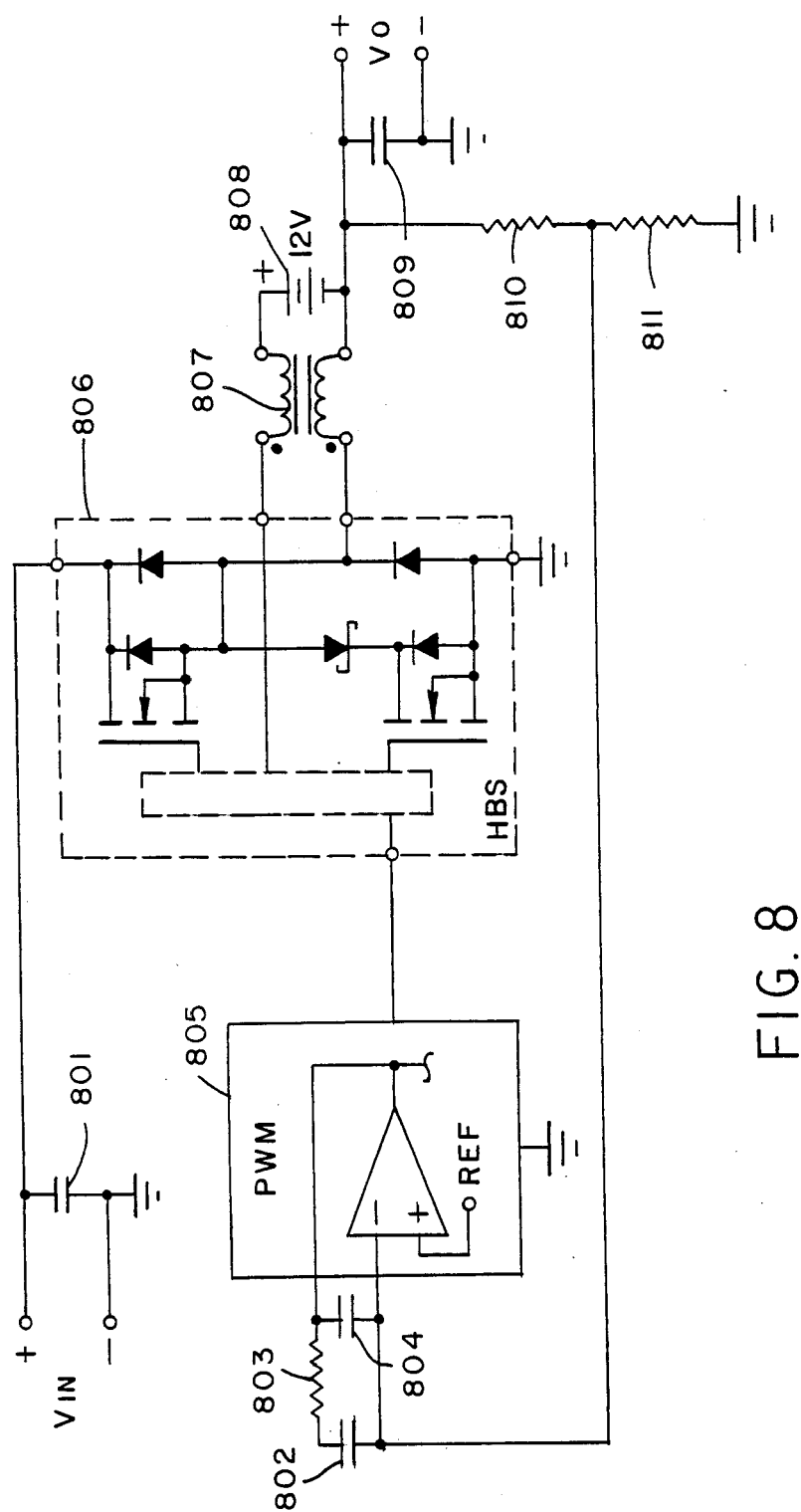
FIG. 8 shows the use of a switch of the kinds shown in FIGS. 1, 2 or 3 as a half-bridge driver for a direct-coupled buck converter capable of maintaining continuous inductor conduction with no load.

FIG. 8 shows a half-bridge electronic switch of the type illustrated in FIGS. 1, 2 and 3 used in a direct coupled buck converter. The pull-up/pull-down output from half-bridge switch 806 causes coupled inductor 807 to maintain continuous inductor conduction and thus stable open loop gain, even with no load. The simple, single-wire interface with pulse width modulator 805 is with respect to ground.

Figure 9:
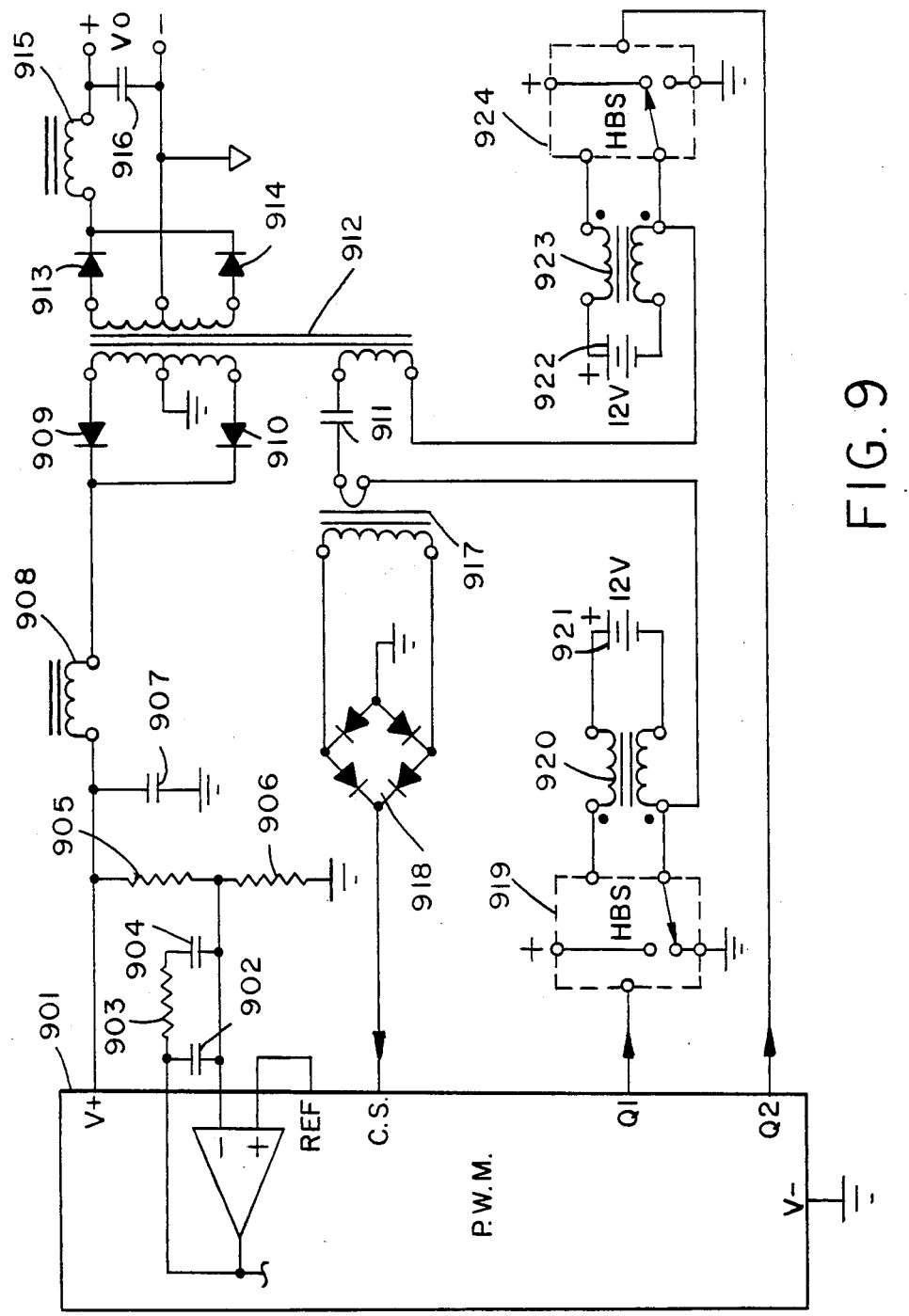
FIG. 9 shows the use of two switches of the kinds shown in FIGS. 1, 2 or 3 used together as a full-bridge driver for a transformer-coupled buck converter.

FIG. 9 shows two half-bridge electronic switches, of the type illustrated in FIGS. 1, 2 and 3 used in a full "H" bridge driven buck converter. Half-bridge switches 919 and 924 are driven directly by pulse width modulator 901 via their ground-referenced single-wire interfaces. Three-state drive to transformer 912 as required for this type of converter is achieved, even though each individual switch is only capable of two-state operation.

Figure 10:
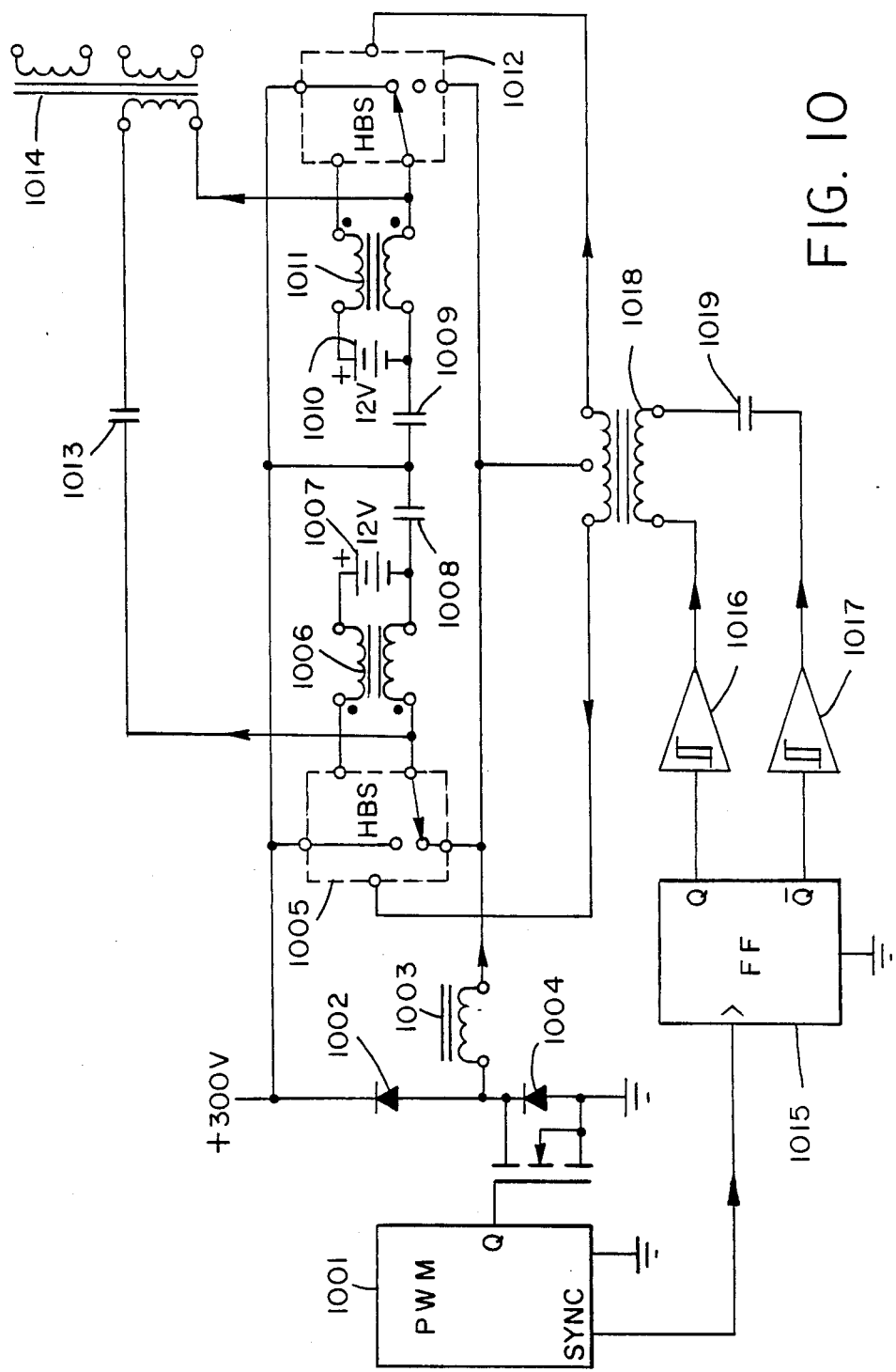
FIG. 10 shows the use of two switches of the kinds illustrated in FIGS. 1, 2 or 3 as a full-bridge DC-DC converter for driving the output transformer in a high-voltage power supply.

FIG. 10 shows two half-bridge electronic switches, of the type illustrated in FIGS. 1, 2 and 3 used as the full-bridge driver for the output stage of a current-fed, high-voltage power supply of the type used to power a traveling wave tube microwave transmitter. Half-bridge switches 1005 and 1012 are driven with a symmetrical push-pull square wave via their respective single-wire interfaces. Since prevention of cross-conduction is an inherent characteristic of the half-bridge switches, there is no requirement for break-before-make or other complex drive schemes. PWM 1001, FET 1004, diode 1002 and inductor 1003 comprise a switch mode regulated buck converter which supplies a pre-regulated current to the output stage.

Figure 11:
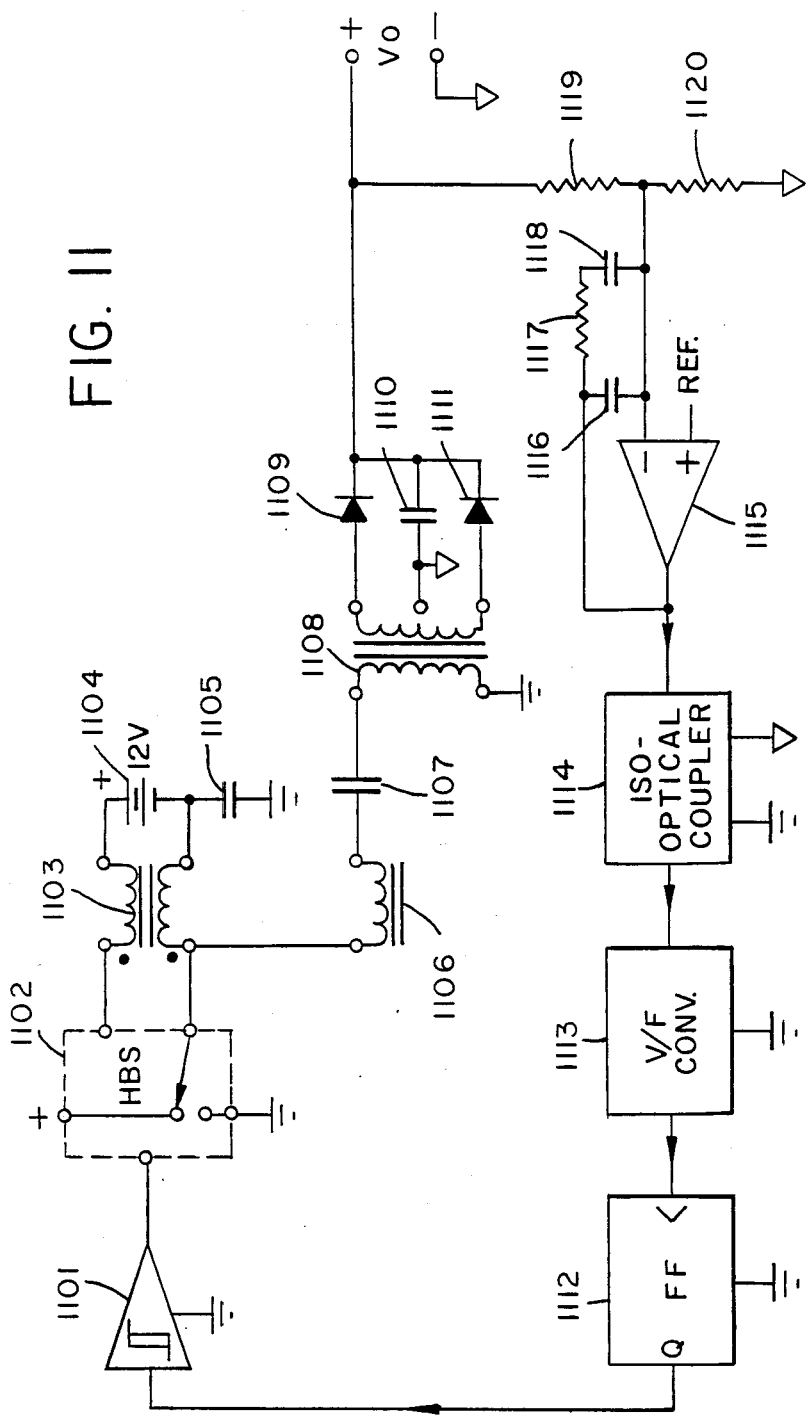
FIG. 11 shows the use of a switch of the kinds shown in FIGS. 1, 2 or 3 as a half-bridge driver for a variable frequency resonant converter.

FIG. 11 shows a half-bridge electronic switch of the type illustrated in FIGS. 1, 2 and 3 used as the switching element in a variable frequency resonant power converter. The simple, single-wire interface, inherent freedom from cross-conduction, and freedom from duty factor limitations are advantages unavailable with other half-bridge electronic switch topologies.

Figure 12:
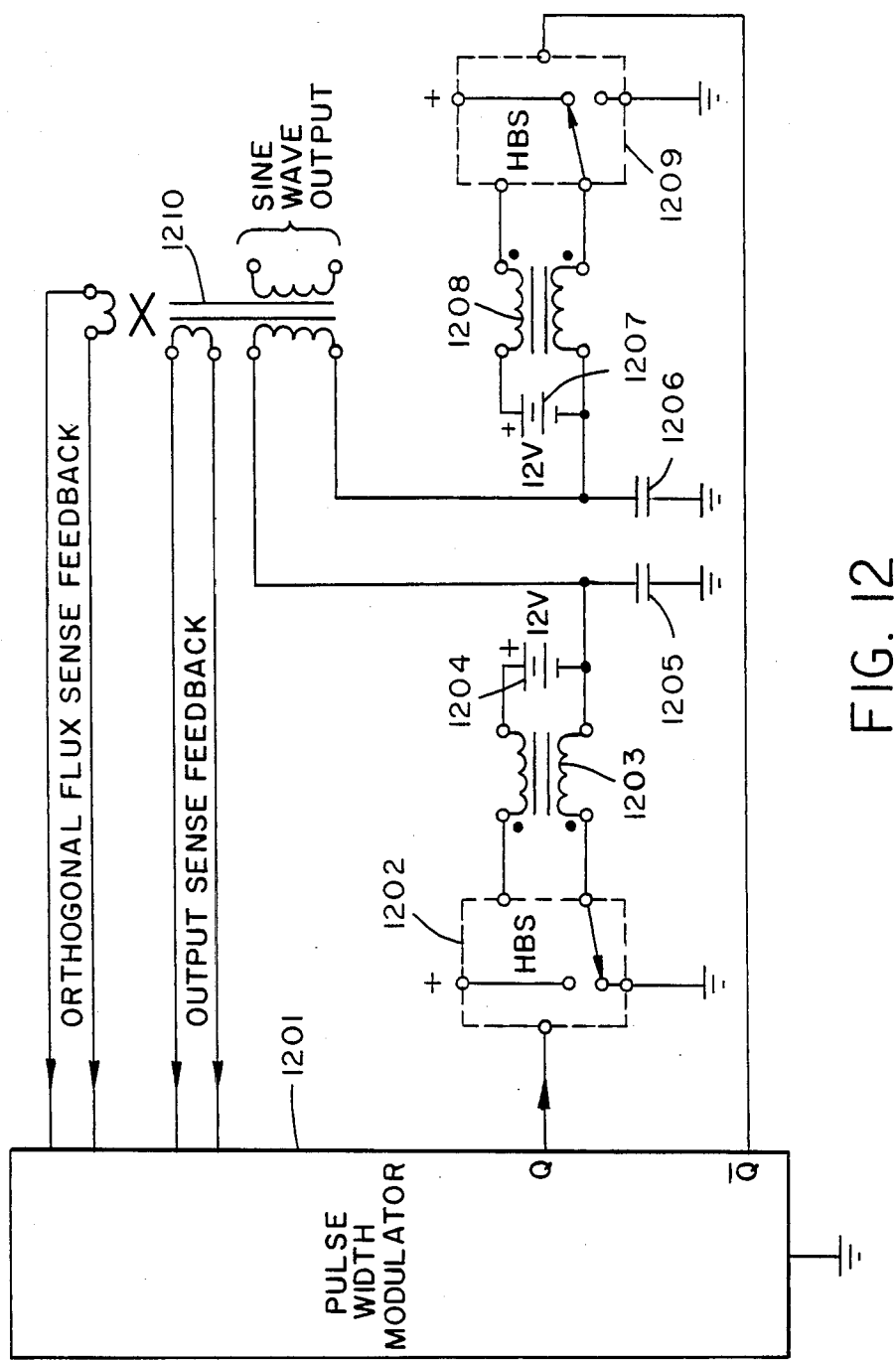
FIG. 12 shows the use of two switches of the kinds illustrated in FIGS. 1, 2 or 3 together as a high-power, high-efficiency sine wave generator in an uninterruptible power supply.

FIG. 12 shows two half-bridge electronic switches, of the type illustrated in FIGS. 1, 2 and 3 used as a full-bridge output stage in an uninterruptible power supply. A typical power supply of this type operates from a storage battery and produces a 115 volts, 60 Hz sine wave output.

Figure 13:
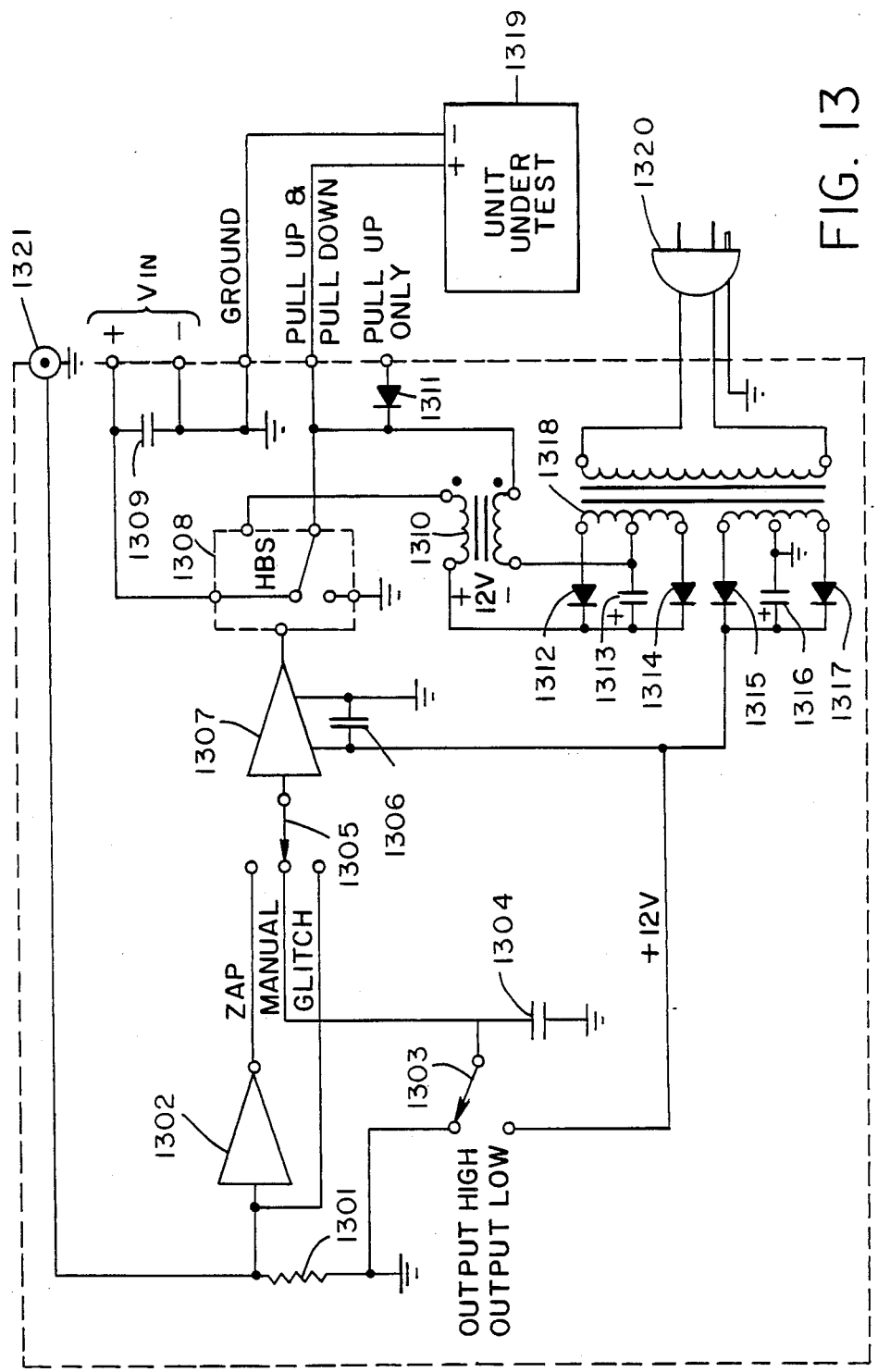
FIG. 13 illustrates the use of the switching apparatus embodiment shown in FIGS. 1, 2 or 3 as a high-power pulse generator for alternately applying input power and short-to-ground signals for ZAP/GLITCH testing of power converters and other electronic modules.

FIG. 13 shows a half-bridge electronic switch of the type illustrated in FIGS. 1, 2 and 3 used as the switching element in a high-power pulse generator for ZAP/GLITCH testing of switch mode power converters and other electronic modules. In this application of the half-bridge switch, the schematic includes a preferred arrangement for providing housekeeping power. The output is controlled by a logic level pulse applied to connector 1321 or by manual switch selection. The output pulse amplitude is approximately equal to the voltage applied at $V_{IN}$ with a typical maximum limit of 300 volts. The pulse frequency can be from DC to approximately one Mhz, and output current can be greater than 10 amperes.

Figure 14:
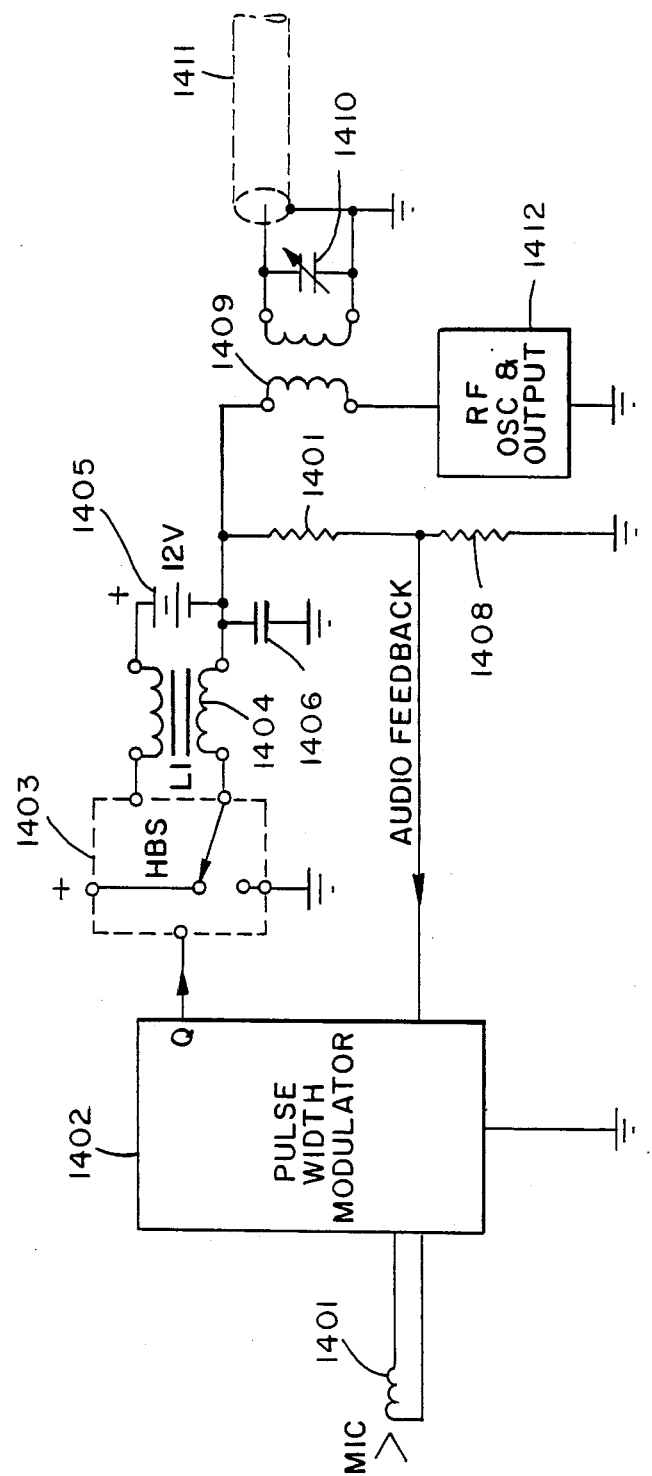
FIG. 14 shows the use of the switching apparatus shown in FIGS. 1, 2 or 3 as the driving element in a high-power, high-efficiency audio amplifier for modulating an AM transmitter.

FIG. 14 shows a half-bridge electronic switch of the type illustrated in FIGS. 1, 2 and 3 used as the switching element in a high power switch mode audio amplifier for modulating an AM transmitter. The output of microphone 1401 is amplified in pulse width modulator 1402 and compared with the audio feedback from resistors 1407 and 1408. The resulting error voltage modulates the duty factor of the "Q" output of the pulse width modulator and, hence, the duty factor of the output half-bridge switch 1403. Coupled inductor 1404 and capacitor 1406 remove the switching frequency square wave resulting in an audio voltage across capacitor 1406 that is a replica of the microphone output. Most high powered audio amplifiers are actually servo amplifiers since they employ feedback in a closed loop system. The audio amplifier in FIG. 14 is a switch mode servo system used as an audio amplifier.

What is claimed is:

1. A two-state switching apparatus adapted to drive a load comprising a first FET; single-wire connector means for connecting said switching apparatus to source means for switching signals, said single-wire connector means being connected to the gate of said first FET; a second FET, said second FET having its gate connected to the drain of said first FET, and its source connected to the drain of said first FET through means for preventing cross-current from said first FET to said second FET and for permitting the gate voltage on said second FET to be raised sufficiently high to turn on said second FET; and means for delivering on and off signals to said second FET, and for holding said second FET on or off in response to switching signals having a duty factor in the range of 0% to 100%.

2. The two-state switching apparatus of claim 1 comprising a first logic signal path from said single-wire connector means to the gate of said second FET including means connecting the drain of said first FET to the gate of said second FET, and a second logic signal path that includes signal-processing means including amplifying means that is bootstrapped to the source of said second FET.

3. The two-state switching apparatus of claim 2 further comprising a power supply apparatus including DC source means at or near AC ground potential connected to said bootstrapped amplifier means, said amplifier means having common mode AC potential substantially above ground imposed thereon, said amplifier means being connected to said DC source through means for permitting the duty factor of said switching apparatus to vary from zero percent to 100 percent.

4. The two-state switching apparatus of claim 2 wherein said second logic signal path from said single-wire connector means to the gate of said second FET comprises driving means consisting of a bootstrapped inverting amplifier having input means connected to said single-wire connector means through diode means, and output means connected to the gate of said second FET.

5. The two-state switching apparatus of claim 4 wherein said output means is connected to the gate of said second FET through means for limiting transient current and for preventing parasitic oscillation of said second FET.

6. The two-state switching apparatus of claim 2 wherein said second logic signal path from said single-wire connector means to the gate of said second FET comprises driving means which includes bootstrapped transistor amplifier means having input means driven by inductor means connected through a first switching means to said single-wire connector means and power supply means for keeping said transistor amplifier means turned off and for keeping said inductor means charged with stored energy when the input signal on said single-wire connector is in the high state, and having output means connected to the gate of said second FET; second switching means for keeping said inductor means charged with stored energy when the two-state output of said switching apparatus is in the high state; and current source means connected to the gate of said second FET.

7. The two-state switching apparatus of claim 6 further comprising means connecting the output of said transistor amplifier means to the gate of said second FET for limiting transient currents and for preventing parasitic oscillation of said second FET.

8. The two-state switching apparatus of claim 2 wherein said second logic signal path from said single-wire connector means to the gate of said second FET comprises driving means which includes bootstrapped transistor amplifier means driven by inductor means connected through a first diode switching means to power supply means and to the drain of said first FET for keeping said transistor amplifier means turned off and for keeping said inductor means charged with stored energy when said first FET is conducting and through a second diode switching means to power supply means and to the output of said two-state switching apparatus for keeping said inductor means charged with stored energy when the two-state output of said switching apparatus is in the high state and with the output of said transistor amplifier being connected to the gate of said second FET; and current source means connected to the gate of said second FET.

9. The two-state switching apparatus of claim 8 wherein the output of said transistor amplifier is connected to the gate of said second FET through means for preventing parasitic oscillation of said second FET.

* * * * *